(12) United States Patent
Reiners

(10) Patent No.: US 9,109,640 B2
(45) Date of Patent: Aug. 18, 2015

(54) FRICTION PLATE WITH A PAPER FRICTION LINING, METHOD FOR PRODUCING SUCH A FRICTION PLATE AND WET-RUNNING MULTIPLATE CLUTCH OR BRAKE COMPRISING SUCH A FRICTION PLATE

(75) Inventor: Volker Reiners, Hockenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 31 days.

(21) Appl. No.: 13/560,265

(22) Filed: Jul. 27, 2012

(65) Prior Publication Data

US 2013/0032271 A1 Feb. 7, 2013

(30) Foreign Application Priority Data

Aug. 4, 2011 (DE) .......................... 10 2011 109 452

(51) Int. Cl.
*F16D 13/68* (2006.01)
*F16D 13/64* (2006.01)

(52) U.S. Cl.
CPC .............. *F16D 13/648* (2013.01); *F16D 13/64* (2013.01); *Y10T 156/10* (2015.01)

(58) Field of Classification Search
USPC ............. 428/156, 167, 172, 212; 192/107 M, 192/107 R, 66.3, 66.1, 70.2, 70.12, 113.36, 192/113.34, 113.3; 188/72.1, 71.5; 74/446, 74/447; 156/60
See application file for complete search history.

(56) References Cited

U.S. PATENT DOCUMENTS

| | | | |
|---|---|---|---|
| 4,941,559 A * | 7/1990 | Ishikawa et al. | 192/107 R |
| 5,101,653 A * | 4/1992 | Hermes et al. | 72/393 |
| 5,176,236 A * | 1/1993 | Ghidorzi et al. | 192/107 R |
| 5,566,802 A * | 10/1996 | Kirkwood | 192/3.29 |
| 7,650,977 B2 * | 1/2010 | Suzuki et al. | 192/113.36 |
| 8,474,590 B2 * | 7/2013 | Fabricius et al. | 192/113.36 |
| 2005/0039872 A1 * | 2/2005 | Kimura et al. | 162/135 |
| 2007/0151822 A1 * | 7/2007 | Toya et al. | 192/70.14 |
| 2010/0294615 A1 * | 11/2010 | Runge et al. | 192/107 M |

* cited by examiner

*Primary Examiner* — David J Hlavka
(74) *Attorney, Agent, or Firm* — BrooksGroup

(57) ABSTRACT

A friction plate (2) with a friction lining carrier (18) and a paper friction lining (24) arranged on one side of the friction lining carrier (18) to form a friction surface, which comprises at least one first friction lining portion (32) and at least one second friction lining portion (34), the friction surface (36) in the first friction lining portion (32) being raised relative to the friction surface (38) in the second friction lining portion (34). The first friction lining portion (32) exhibits a lower resin absorption than the second friction lining portion (34). The invention furthermore relates to a method for producing such a friction plate (2) and to a wet-running multiplate clutch or brake comprising such a friction plate (2).

16 Claims, 4 Drawing Sheets

Figure 1:
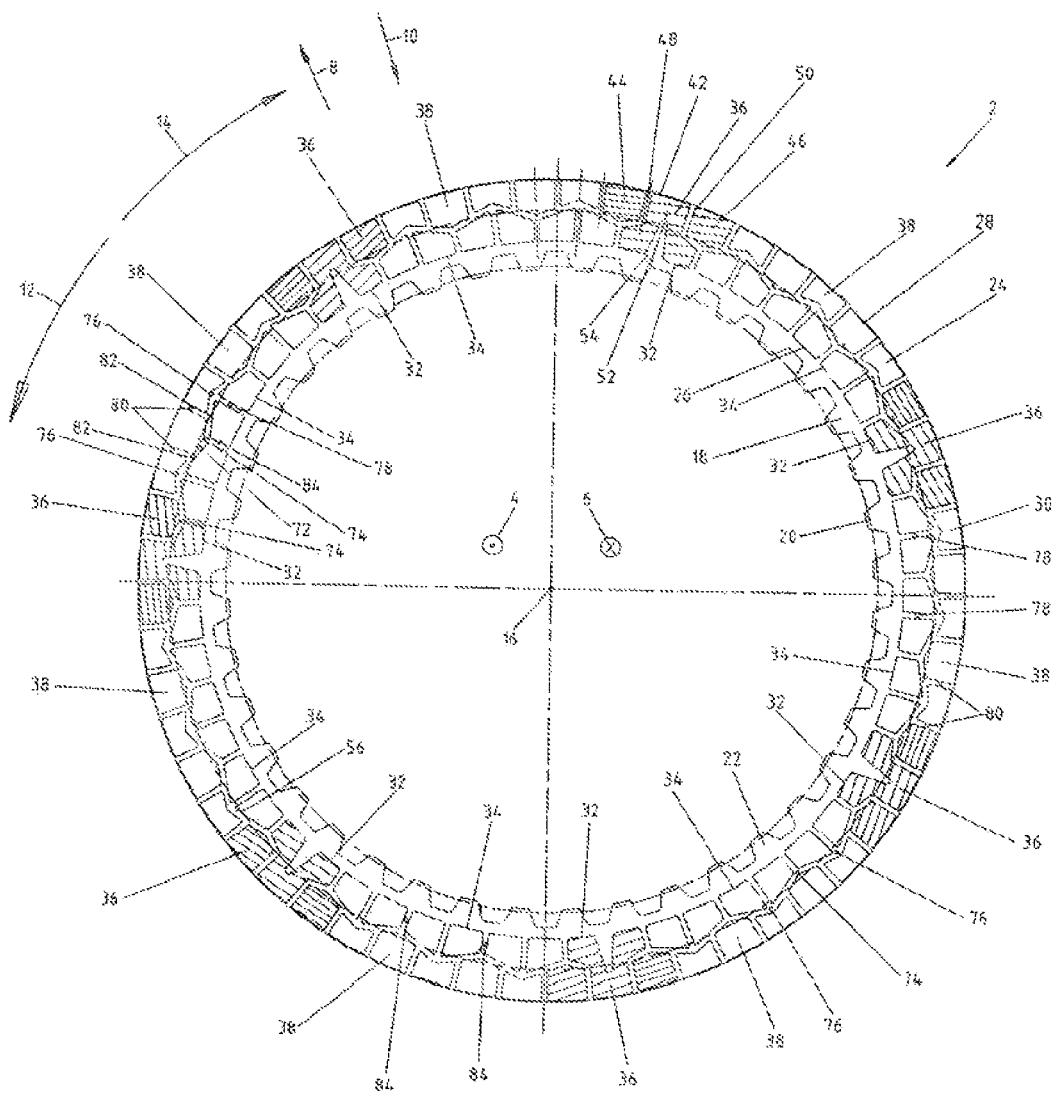

FRICTION PLATE WITH A PAPER FRICTION LINING, METHOD FOR PRODUCING SUCH A FRICTION PLATE AND WET-RUNNING MULTIPLATE CLUTCH OR BRAKE COMPRISING SUCH A FRICTION PLATE

CROSS-REFERENCE TO RELATED APPLICATIONS

This application claims the benefit of German Patent Application Serial No. 10 2011 109452.4 filed Aug. 4, 2011.

DESCRIPTION

The present invention relates to a friction plate with a friction lining carrier and a paper friction lining arranged on one side of the friction lining carrier to form a friction surface, which comprises at least one first friction lining portion and at least one second friction lining portion, the friction surface in the first friction lining portion being raised relative to the friction surface in the second friction lining portion. The present invention furthermore relates to a method for producing such a friction plate and to a wet-running multiplate clutch or brake comprising such a friction plate.

Multiplate clutches which comprise a first plate pack of steel plates on the input or output side and a second plate pack of friction plates on the output or input side are known from the prior art. The two interleaved plate packs are pushed together in the axial direction in order to achieve a frictional rotational drive connection between the input and output sides. If the input side is to be uncoupled again from the output side, a corresponding actuating element is retracted again, such that the steel plates and friction plates of the two plate packs can move back apart from one another. When the multiplate clutch is in the latter described disengaged state, in order to avoid unwanted torque transmission between the mutually associated friction and steel plates, which may for example be attributable to drag torque acting between the stated plates, the friction and steel plates must be separated from one another in the axial direction after disengagement of the multiplate clutch.

Separate spring devices are, for example, accordingly known which act between the steel plates on the one hand and the respective adjacent friction plate on the other hand. Friction plates with a friction lining carrier are furthermore known from practical applications, on which carrier is arranged a paper friction lining forming a friction surface, the paper friction lining comprising first friction lining portions and second friction lining portions. The friction surface in the first friction lining portions is here raised relative to the friction surface in the second friction lining portions, and the first friction lining portions moreover exhibit greater resilience than the second friction lining portions. In other words, the steel and friction plate are here separated in the disengaged state of the multiplate clutch by the more resilient first friction lining portions having the friction surface which is raised relative to the friction surface of the second friction lining portions.

Known friction plates with more resilient and raised first friction lining portions have proved successful, but are associated with a number of disadvantages. It has, for instance, been found that production of the known friction plates is made more complicated, especially since purposefully setting a predefined resilience in the friction lining portions is only possible with considerable effort. It has furthermore been found that the distinctly higher friction surfaces of the more resilient first friction lining portions have a negative influence on the friction behavior of the multiplate clutch. Moreover, even once the friction and steel plates have separated in the axial direction, a relatively high level of unwanted drag torque still occurs.

It is therefore an object of the present invention to provide a friction plate of the generic type, which is simple to manufacture, exhibits good friction behavior and, when used in a friction-operating device, such as for example a multiplate clutch or brake, brings about reduced drag torque. Another object of the present invention is to provide a simplified method for producing such an advantageous friction plate, by means of which the resilience of the friction lining portions and thus the separation behavior of the plates when used in a friction-operating device, may be set purposefully and reliably. A further object of the present invention is to provide a wet-running multiplate clutch or brake having at least one friction plate of the kind according to the invention, in which reliable and purposeful separation of the plates in the disengaged state of the multiplate clutch is possible, it furthermore being intended to reduce drag torque in the disengaged state.

Said objects are achieved by the features respectively stated in patent claims 1, 11 and 15. Advantageous embodiments of the invention constitute the subject matter of the subclaims.

The friction plate according to the invention, which is preferably designed for a friction-operating device, particularly preferably a wet-running multiplate clutch or brake, comprises a friction lining carrier. The friction lining carrier may for example be formed of a sheet metal part, the friction lining carrier preferably taking the form of an annular disk, particularly preferably provided with internal or external teeth. The friction plate furthermore comprises a paper friction lining for forming a friction surface of the friction plate, the paper friction lining being arranged, preferably strongly adhesively bonded, on one side of the friction lining carrier. The friction plate according to the invention may be both a friction plate provided on one side with a paper friction lining and a friction plate provided on both sides in each case with a paper friction lining. In the latter-stated case, the explanations provided here regarding the paper friction lining on one side of the friction lining carrier preferably apply correspondingly to the paper friction lining on the other side of the friction lining carrier. The paper friction lining comprises at least one first friction lining portion and at least one second friction lining portion. The two stated friction lining portions may for example be formed in a single piece with one another or separately from one another, the latter option being preferred with regard to manufacture and with regard to a suitable functional separation. Both the first and the second friction lining portion form part of the friction surface of the paper friction lining, the friction surface in the first friction lining portion being raised relative to the friction surface in the second friction lining portion. It may thus for example also be stated that the friction surface in the first friction lining portion is raised in such a manner that, on engagement of a friction-operating device, said friction surface comes into contact with the friction partner, thus for example a steel plate, before the friction surface in the second friction lining portion. According to the invention, the first friction lining portion of the paper friction lining exhibits a lower resin absorption than the second friction lining portion of the paper friction lining. Resin absorption is a percentage value which is obtained by dividing the resin weight, i.e. the weight of the resin absorbed into the paper of the respective friction lining portion, by the weight of the paper, i.e. the weight of the paper used for the respective friction lining portion, and multiplying the result by 100.

Thanks to the lower resin absorption in the first friction lining portion, a first friction lining portion which exhibits greater resilience than the second friction lining portion is made available. The first friction lining portion, the friction surface of which is raised relative to the friction surface in the second friction lining portion and the lower resin absorption of which brings about greater resilience, is thus capable, in the disengaged state of a friction-operating friction device, thus for example of a multiplate clutch or brake, of ensuring reliable separation or parting of the friction partners. It has here been found that the resilience of the first and second friction lining portions may be set particularly reliably and purposefully by means of the respective resin absorption without this consequently entailing greater manufacturing effort. In other words, the invention provides a friction plate which, on the one hand, is simple to manufacture and, on the other hand, allows the separation behavior between the adjacent plates of a friction-operating device in the disengaged state to be set particularly accurately.

In a preferred embodiment of the friction plate according to the invention, the difference between the resin absorption in the first friction lining portion and the resin absorption in the second friction lining portion amounts to at least 15 percentage points, preferably at least 20 percentage points, particularly preferably at least 24 percentage points. It has been found that particularly reliable and fast separation of the mutually associated plates of a friction-operating device is achieved when the difference in resin absorption amounts to at least 15 or at least 20 percentage points and the first friction lining portion is thus made distinctly more resilient than the second friction lining portion. Particularly good results with regard to reliable and rapid separation of the plates in a friction-operating device have been observed with a difference in resin absorption which amounts to at least 24 percentage points.

It has been found that while a relatively low resin absorption in the first friction lining portion is indeed suitable for increasing the resilience thereof, an excessively low resin absorption in the first friction lining portion reduces the temperature and compression resistance of the first friction lining portion to such an extent that the service life of the first friction lining portion is limited. In contrast, a greatly increased resin absorption in the second friction lining portion does indeed increase its heat resistance and the surface pressure it can withstand, but resilience is reduced to such an extent that friction behavior is impaired. In order to overcome the above-stated disadvantages, in a particularly preferred embodiment of the friction plate according to the invention the resin absorption of the first friction lining portion and of the second friction lining portion in each case amounts to between 20% and 60%, preferably between 24% and 56%. In this way, it is possible to provide a friction plate which is particularly durable and exhibits good friction behavior and which ensures reliable separation or parting of the plates within a friction-operating device.

In order to be able simply and accurately to set the difference in resilience between the first friction lining portion and the second friction lining portion and thus to simplify production of the friction plate, in a further preferred embodiment of the friction plate according to the invention, in each case the same resin is absorbed in the first friction lining portion and the second friction lining portion. It is here preferable for exclusively the same resin to be absorbed in the first and second friction lining portions.

Alternatively or in addition to the previously described embodiment, in a further preferred embodiment of the friction plate according to the invention the first friction lining portion and the second friction lining portion are manufactured from the same paper in order to reduce the manufacturing effort for the friction plate and to provide a friction plate with friction lining portions, the different characteristics of which may be purposefully set. The same paper should here preferably be taken at least to mean that the papers used to produce the two friction lining portions have the same composition. The same paper should particularly preferably be taken to mean that the papers used to produce the two friction lining portions have the same composition and the same density. In this embodiment it is additionally preferred for the second friction lining portion to exhibit a smaller lining thickness, produced by compression thereof, than the first friction lining portion. In this embodiment, the higher density and thus also the lower resilience of the second friction lining portion is consequently additionally attributable to compression thereof, which, complementarily to the different resin absorption, may be carried out relatively simply and precisely in order to achieve the different characteristics of the friction lining portions, such that manufacture of such a friction plate is further simplified. It is furthermore preferred in this embodiment for the above-mentioned compression to proceed in the course of fastening, preferably of conclusive or final fastening, of the second friction lining portion to the friction lining carrier.

In a further particularly preferred embodiment of the friction plate according to the invention, the friction surface in the first friction lining portion is arranged at most 0.12 mm, preferably at most 0.072 mm, particularly preferably at most 0.036 mm, higher than the friction surface in the second friction lining portion. It has been found that distinctly improved friction behavior could be achieved by establishing the above-stated absolute limits for the difference in height between the friction surfaces in the first and second friction lining portions. In particular in a low rotational speed range, it was possible to reduce drag torque in a friction-operating device in the low rotational speed range.

Alternatively or in addition to the previously described embodiment, in an advantageous embodiment of the friction plate according to the invention the sides of the first and second friction lining portions facing the friction lining carrier are supported in a common plane on the friction lining carrier. In this embodiment, the difference in height between the friction surface in the first friction lining portion and the friction surface in the second friction lining portion is consequently brought about by different lining thicknesses of the first and second friction lining portions, while the friction lining carrier has merely to provide a supporting surface in the common plane in order to support the first and second friction lining portions. In this way, on the one hand, manufacturing effort for the friction lining carrier is reduced, so further simplifying production of the friction plate. Furthermore, the difference between the first friction lining portion and the second friction lining portion with regard to the lining thickness may advantageously be achieved by the above-mentioned compression of the second friction lining portion, whereby the characteristics of the second friction lining portion may undergo further or complementary purposeful setting, which second friction lining portion has a higher density and thus also a lower resilience as a result of the compression.

In a further advantageous embodiment of the friction plate according to the invention, the friction surface formed by the first friction lining portions amounts to less than 50%, preferably at most 30%, particularly preferably at most 3%, of the total friction surface of the paper friction lining. The total friction surface here thus constitutes the entire area of all the friction surfaces of the paper friction lining which may be brought into frictional connection with a friction partner, such as for example a steel plate. Accordingly, grooves between friction surface segments or lining segments do not, for example, count towards the total friction surface. Thanks to the stated limitation or reduction of the friction surface formed by the first friction lining portions, it is possible to achieve a marked reduction in drag torque in a friction-operating device. It has proven most effective in this respect for the friction surface formed by the first friction lining portions to amount to at most 3% of the total friction surface, it still being possible to achieve a relatively marked reduction in drag torque up to a proportion of at most 30%.

It has been found that it is not only the proportion of the total friction surface of the paper friction lining formed by the first friction lining portions which influences drag torque, but the number of the first friction lining portions, which serve to separate the friction partners in the disengaged state of the friction-operating device, also has an influence on the drag torque. The smaller the number of first friction lining portions, the greater the achievable reduction in drag torque in the friction-operating device. For this reason, in a further advantageous embodiment of the friction plate according to the invention there are at most seven, preferably at most five, particularly preferably at most three, first friction lining portions, particularly low drag torque being achievable in the latter-stated preferred embodiment, without in so doing jeopardizing the reliable and uniform separation of the mutually adjacent plates by the at most three first friction lining portions. It is furthermore preferred in this embodiment for the first friction lining portions to be spaced apart from one another in the circumferential direction, in order to achieve reliable and uniform separation of the friction partners in the disengaged state of the friction-operating device, it additionally being preferred for the first friction lining portions to be uniformly spaced apart from one another in the circumferential direction. It is moreover preferred in this embodiment for the second friction lining portions to be arranged in the circumferential direction between the first friction lining portions spaced apart from one another in the circumferential direction, in order also to obtain homogeneous friction behavior over the circumference of the friction plate in the engaged state of the friction-operating device.

An alternative variant embodiment of the above-described embodiment provides at most one first friction lining portion. It has surprisingly been found that it is still possible in this way to achieve good separation behavior on the one hand and a great reduction in drag torque on the other hand.

While the resilient, raised first friction lining portions known from practical application in each case form a contiguous friction surface, in a further particularly advantageous embodiment of the friction plate according to the invention the friction surface formed by an individual first friction lining portion is segmented. It is here possible either for only the friction surface formed by the individual first friction lining portion to be segmented, while the first friction lining portion itself is in one piece, this being achievable for example by cooling oil grooves on the surface which do not, however, interrupt the continuity of the first friction lining portion. Preferably, however, the first friction lining portion itself, in addition to the friction surface, may also be segmented, such that the friction lining portion is formed of at least two, mutually separately formed segments, between which extends a cooling oil groove, the bottom of which is formed by the friction lining carrier. It has been found that a segmented friction surface of the first friction lining portion, optionally a segmented first friction lining portion, brings about a further reduction in drag torque. In this embodiment, it has been found to be particularly advantageous with regard to drag torque and with regard to uniform support on the opposing friction partner for the friction surface formed by the individual first friction lining portion or the first friction lining portion itself to be subdivided into at least three segments, which particularly preferably in each case define with one of the other segments a cooling oil groove.

In a further advantageous embodiment of the friction plate according to the invention, a blind groove is formed in the first friction lining portion or in the second friction lining portion in order to provide further assistance to the separation process which proceeds in a friction-operating device in the disengaged state due to the first friction lining portions. Such a blind groove, for example in a wet-running multiplate clutch, may give rise to an elevated cooling oil pressure which assists separation or parting of the plates in the disengaged state of the multiplate clutch. In this embodiment, the blind groove preferably extends in the radial direction starting from an inner edge of the paper friction lining. In order to further assist pressure build-up within the blind groove and thus intensify separation of the plates, the blind groove preferably tapers in the stated radial direction in this embodiment. It is additionally preferred in this embodiment for the blind groove to be formed in the first friction lining portion or in the second friction lining portion, while no blind groove or at least no blind groove of the above-described kind is provided in the other friction lining portion. If the blind groove is provided, for example, in the second friction lining portion, the blind groove assists separation of the plates both by the first friction lining portion and by the second friction lining portion. More effective separation is however achieved in that the blind groove is provided in the first friction lining portion, while the second friction lining portion does not comprise a blind groove, such that this variant embodiment is preferred in which an advantageous functional separation is moreover achieved between the first and second friction lining portions.

In order, on the one hand, to achieve uniform separation of the plates over the total width thereof in the radial direction and, on the other hand, relatively uniform friction behavior over the circumference of the friction plate, in a further particularly preferred embodiment of the friction plate according to the invention the first friction lining portion extends from the inner edge to the outer edge of the paper friction lining, the first friction lining portion being arranged in alignment at least in part in the radial direction with a second friction lining portion which is adjacent in the circumferential direction. The first friction lining portion may accordingly for example be T-shaped, which has proved particularly effective. Should the friction surface formed by the first friction lining portion or the first friction lining portion itself be segmented, as was previously described with reference to another embodiment, it is preferred in the present embodiment for one of the segments to be continuous from the inner edge to the outer edge of the paper friction lining, in order to achieve particularly uniform separation over the width of the friction plate in the radial direction. Should moreover the blind groove described with reference to another embodiment of the invention be provided in the first friction lining portion, it is furthermore particularly preferred in the present embodiment for said blind groove to be formed in the above-mentioned continuous segment of the friction surface formed by the first friction lining portion or of the first friction lining portion itself. In this way, a relatively long blind groove may be obtained which is suitable for bringing about still better separation of the mutually adjacent plates.

The method according to the invention relates to a method for producing a friction plate, preferably an embodiment of the above-described friction plate according to the invention, and comprises the method steps described below in greater detail. First of all, a first paper is impregnated with resin, such that said first paper exhibits a predefined first resin absorption. A second paper is correspondingly impregnated with resin, such that it exhibits a predefined second resin absorption. Reference is made to the above description of the friction plate according to the invention with regard to the definition of resin absorption. Impregnation of the first and second papers here proceeds in such a manner that the second resin absorption is greater than the first resin absorption. The difference in resin absorption here preferably amounts to at least 15 percentage points or at least 20 percentage points, particularly preferably at least 24 percentage points. A friction lining carrier, preferably taking the form of an annular disk, is furthermore provided, which particularly preferably comprises internal or external teeth. The friction lining carrier may for example be formed as a sheet metal part. The first paper is then applied onto the friction lining carrier to produce at least one first friction lining portion, while the second paper is applied onto the friction lining carrier to produce at least one second friction lining portion. Application may for example be carried out such that parts or segments are stamped out from the first or second paper and pressed onto the friction lining carrier, where these parts or segments are initially relatively simply fastened, preferably provisionally tacked or bonded, while the final or conclusive fastening particularly preferably proceeds in a subsequent method step. The first and second papers are here applied onto the friction lining carrier in such a manner that a friction surface in the first friction lining portion is raised relative to a friction surface in the second friction lining portion. Friction lining portions with different resilience may be manufactured particularly simply and rapidly thanks to the method according to the invention. The resilience of the first and second friction lining portions may furthermore be set very accurately by means of the respective resin absorption. Reference is moreover made to the advantages of the above-described friction plate according to the invention, which apply correspondingly to the method according to the invention.

In an advantageous embodiment of the method according to the invention, the first paper and the second paper are impregnated in such a manner with resin that the resin absorption of the first paper and of the second paper in each case amounts to between 20% and 60%, preferably between 24% and 56%.

In a preferred embodiment of the method according to the invention, the first paper and the second paper are impregnated with the same resin, preferably exclusively with the same resin. Alternatively or in addition, the same paper is used for the first paper and the second paper. With regard to the definition of the same paper, reference is made to the above description relating to the friction plate according to the invention. When using the same paper, it is furthermore preferred for the first paper and the second paper additionally to have the same thickness.

In order to be able to set the density of the second paper, and thus the resilience thereof, in a particularly simple and purposeful manner, in a further preferred embodiment of the method according to the invention the second paper is compressed, with reduction of the paper thickness of the second paper, preferably on fastening to the friction lining carrier, in such a manner that the lining thickness of the second friction lining portion is less than the lining thickness of the first friction lining portion. In this embodiment it is furthermore preferred for the provided friction lining carrier to be constructed or fabricated in such a manner that both the first paper and the second paper may be supported and fastened to the friction lining carrier in a common plane.

In one particularly advantageous embodiment of the method according to the invention, the first paper is applied onto the friction lining carrier in such a manner that the first friction lining portion extends from the inner edge to the outer edge of the paper friction lining, while the second paper is applied onto the friction lining carrier in such a manner that the first friction lining portion is arranged in alignment at least in part in the radial direction with a second friction lining portion which is adjacent in the circumferential direction.

The wet-running multiplate clutch or brake according to the invention comprises at least one friction plate of the type according to the invention. The wet-running multiplate clutch or brake preferably comprises a hydraulically actuatable multiplate clutch or brake, the multiplate clutch particularly preferably taking the form of a dual plate clutch. In the wet-running multiplate clutch or brake according to the invention, it is furthermore preferred for a steel plate to be assigned to the at least one friction plate according to the invention, with which steel plate the friction plate may be brought into frictional rotational drive connection. Reference is made, with regard to the advantages of the wet-running multiplate clutch according to the invention, to the advantages of the above-described friction plate according to the invention, which apply correspondingly to the wet-running multiplate clutch.

Figure 2:
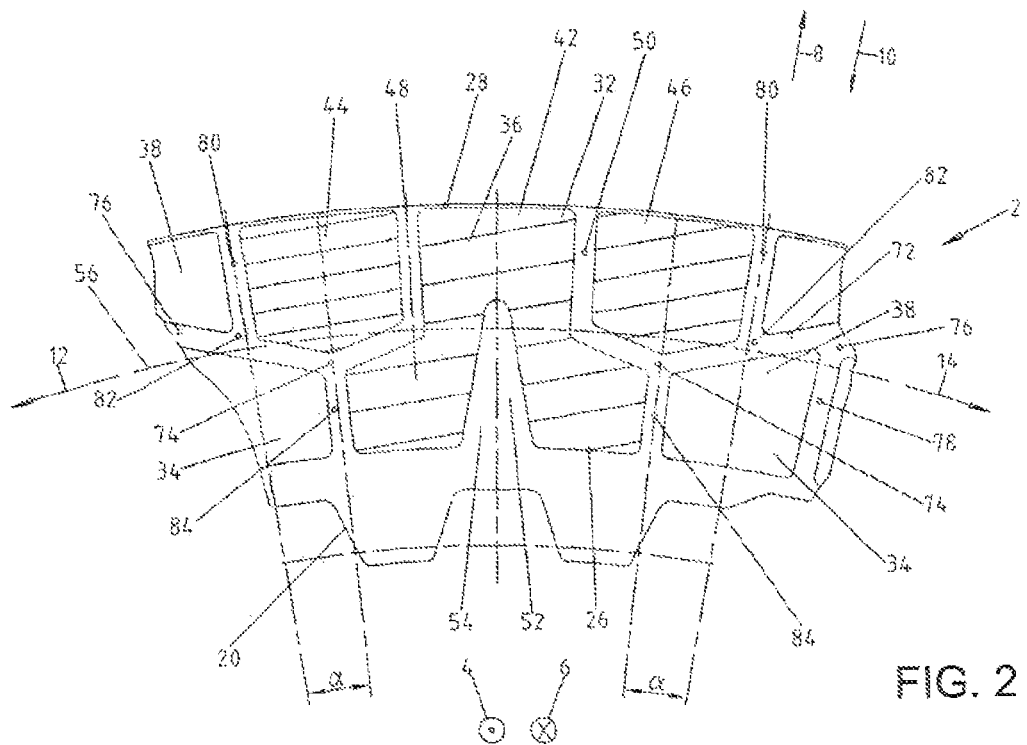
Figure 3:
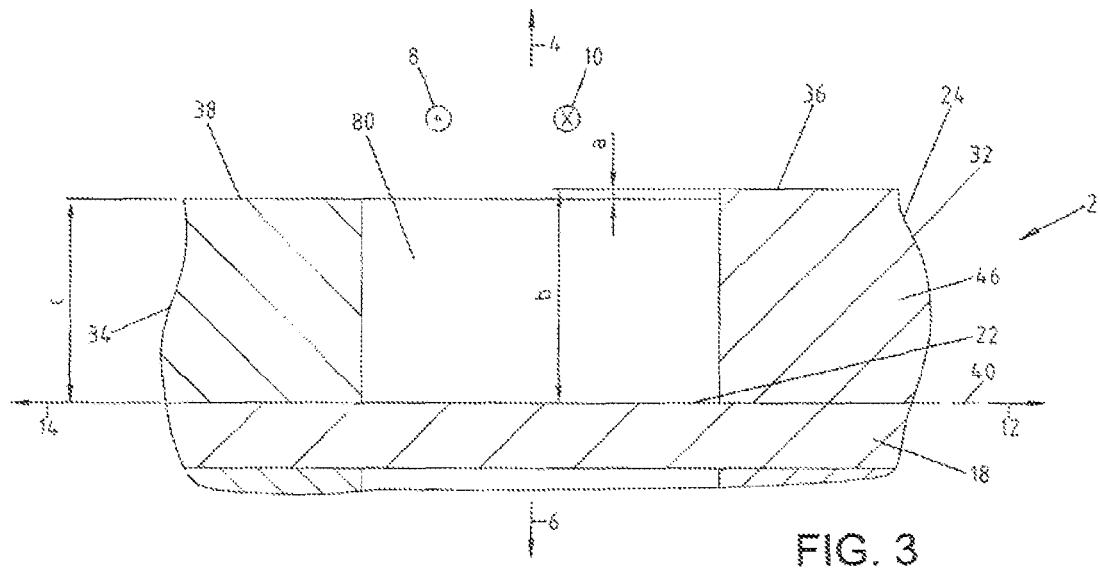
Figure 4:
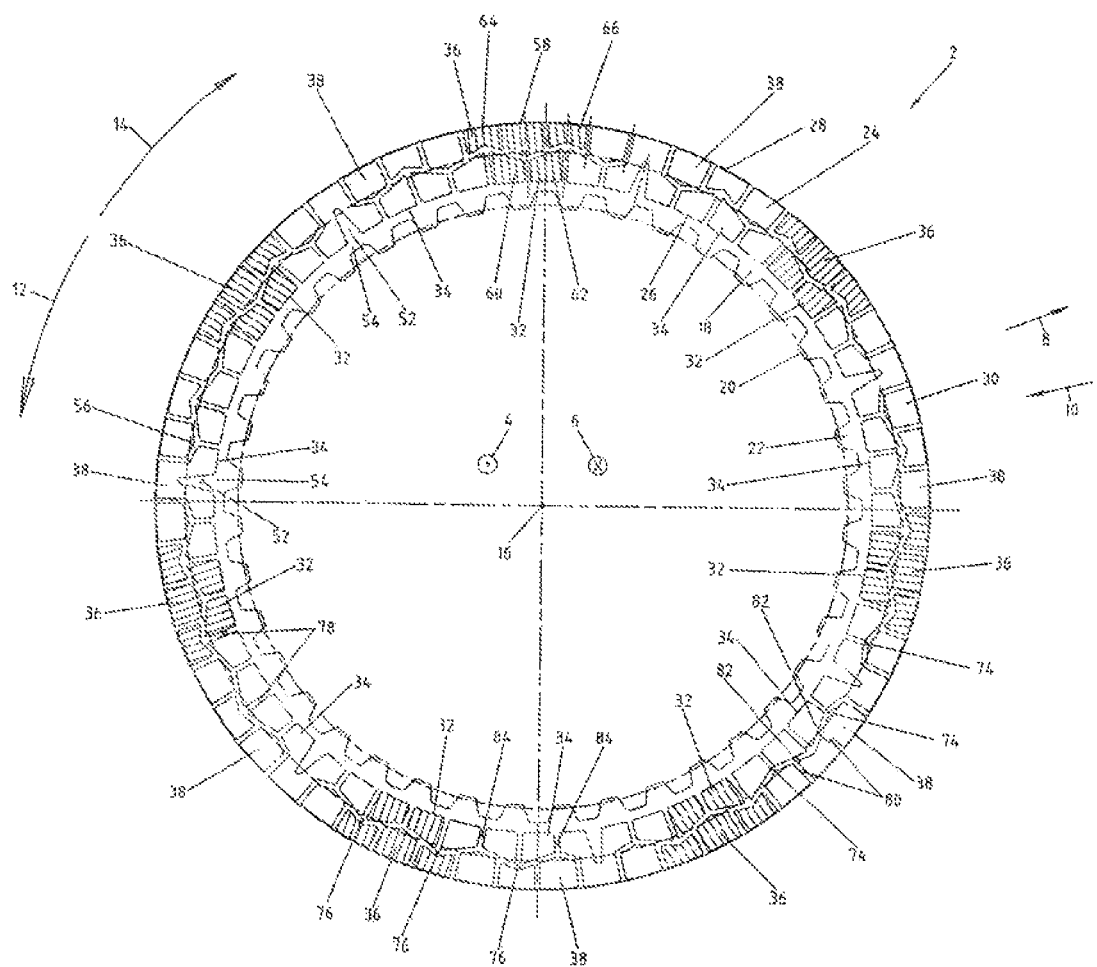
Figure 5:
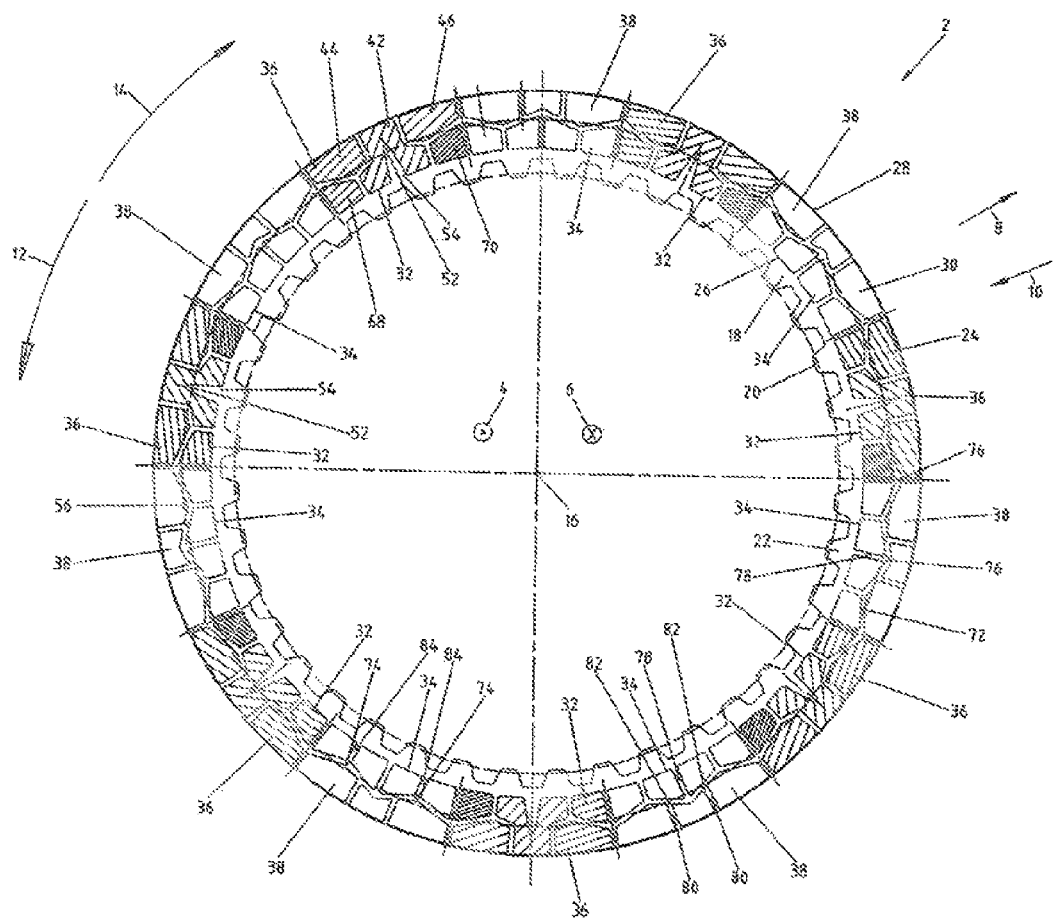

The invention is explained in greater detail below on the basis of exemplary embodiments with reference to the attached drawings, in which:

FIG. 1 is a front view of a first embodiment of the friction plate according to the invention, FIG. 2 is an enlargement of the portion A of FIG. 1, FIG. 3 is a sectional representation along section line B-B of FIG. 2, FIG. 4 is a front view of a second embodiment of the friction plate according to the invention and FIG. 5 is a front view of a third embodiment of the friction plate according to the invention.

FIGS. 1 to 3 show a first embodiment of the friction plate 2 according to the invention. In the present case, the friction plate 2 takes the form of a friction plate for a wet-running multiplate clutch or multiplate brake, which is preferably hydraulically actuatable. A multiplate clutch is particularly preferably a dual plate clutch, in which at least one steel plate is assigned to each of the friction plates 2, with which steel plate the friction plate 2 may be brought into frictional rotational drive connection. Should the friction plate 2 be a friction plate 2 provided on one side with a paper friction lining, it is however likewise possible to assign a further friction plate 2 as a friction partner to each of the friction plates 2. The mutually opposing axial directions 4, 6, the mutually opposing radial directions 8, 10 and the mutually opposing circumferential directions 12, 14 of the friction plate 2 in the form of an annular disk are indicated with corresponding arrows in FIG. 1. The axis of rotation of the friction plate 2 is provided with reference sign 16 and extends in the axial directions 4, 6.

The friction plate 2 comprises a friction lining carrier 18 in the form of an annular disk, which is formed by a sheet metal part and comprises internal teeth 20 on the edge thereof facing in a radially inward direction 10. The internal teeth 20 are here of one-piece construction with the friction lining carrier 18 and serve to connect the friction plate 2 non-rotatably with a plate carrier, while also enabling axial displacement of the friction plate 2 along the plate carrier. The present friction plate 2 is consequently an "inner plate". It should, however, be noted that the friction plate 2 according to the invention could likewise be an outer plate, in which in contrast to FIG.

1 no internal teeth 20 would then be provided on the edge facing in a radially inward direction 10, but instead external teeth would be provided on the edge facing in a radially outward direction 8 of the friction lining carrier 18.

A paper friction lining 24 is arranged on the front side 22 of the friction lining carrier 18 facing towards the observer of FIG. 1. The friction plate 2 may be a friction plate 2 provided on one side with a paper friction lining 24 or a friction plate 2 provided on both sides with a paper friction lining 24. In the latter-stated case, a paper friction lining 24 would also be provided on the reverse side of the friction lining carrier 18 facing away from the observer of FIG. 1, which paper friction lining then preferably also exhibits the characteristics described below with reference to the paper friction lining 24 on the front side 22.

The paper friction lining 24, like the friction lining carrier 18, substantially takes the form of an annular disk and comprises an inner edge 26 facing inward in the radial direction 10 and an outer edge 28 facing outward in the radial direction 8, the outer edge 28 being approximately congruent with the outer edge of the friction lining carrier 18. The paper friction lining 24 thus serves to form a friction surface facing in the axial direction 4, which surface is hereinafter designated the total friction surface 30. The phrase total friction surface 30 here makes it clear that the total friction surface 30 comprises only those areas of the paper friction lining 24 which may actually be brought into frictional engagement with another friction partner, thus for example the steel plate.

The paper friction lining 24 comprises seven first friction lining portions 32, which are uniformly spaced apart from one another in the circumferential direction 12, 14. The number of seven first friction lining portions 32 should here constitute the maximum number. It is moreover preferred for at most five, particularly preferably at most three, first friction lining portions 32 to be provided, although this is not shown in FIG. 1. In this case too, the first friction lining portions 32 would be uniformly spaced apart from one another in the circumferential direction 12, 14. A second friction lining portion 34 of the paper friction lining 24 is in each case arranged in the circumferential direction 12, 14 between the first friction lining portions 32. The number of second friction lining portions 34 thus preferably corresponds to the number of first friction lining portions 32. In order to allow the first friction lining portions 32 and the extent thereof to be more readily differentiated from the second friction lining portions 34, the first friction lining portions 32 are crosshatched in FIG. 1 and FIG. 2. In an alternative embodiment, which is not shown in the figures, just one first friction lining portion 32 is provided. This embodiment of the friction plate surprisingly likewise permits reliable separation on the one hand and a great reduction in drag torque on the other hand.

The first friction lining portions 32 in each case form a first friction sub-surface 36, while the second friction lining portions 34 in each case form a second friction sub-surface 38. The sum of all the first friction sub-surfaces 36 plus the sum of all the second friction sub-surfaces 38 gives rise to the above-mentioned total friction surface 30 of the paper friction lining 24. As is apparent from FIG. 1, the sum of the first friction sub-surfaces 36 amounts to less than 50%, preferably to at most 30%, of the total friction surface 30, as shown in FIG. 1. It is furthermore preferred for the sum of the first friction sub-surfaces 36 to amount to at most 3% of the total friction surface 30, even if this is not shown in the embodiment according to FIG. 1.

The friction surface in the first friction lining portion 32, thus the first friction sub-surface 36, is raised relative to the friction surface in the second friction lining portion 34, thus relative to the second friction sub-surface 38, as is apparent from FIG. 3. In other words, the first friction sub-surface 36 protrudes in the axial direction 4 beyond the second friction sub-surface 38, a difference in height a between the first and second friction sub-surfaces 36, 38 being formed. This difference in height a amounts to at most 0.12 mm, preferably at most 0.072 mm, particularly preferably at most 0.063 mm. It has been found that limiting the difference in height a in this manner makes it possible to improve the drag torque profile.

In the present example, the difference in height a is achieved in that the sides of the friction lining portions 32, 34 facing the friction lining carrier 18 in the axial direction 6 are fastened to or supported on the friction lining carrier 18 in a common plane 40, as is apparent from FIG. 3, the axial directions 4, 6 preferably acting as the surface normal of the plane 40, while the friction lining portions 32, 34 have different lining thicknesses measured in the axial direction 4, 6. The first friction lining portion 32 thus has a lining thickness b, which is greater than the lining thickness c of the second friction lining portion 34, the difference in lining thickness corresponding to the above-mentioned difference in height a.

The smaller lining thickness c of the second friction lining portion 34 is in turn attributable to the fact that the latter was compressed in the axial direction 4, 6, preferably on fastening, particularly preferably on conclusive or final fastening, to the friction lining carrier 18. In the embodiment shown, the first and second friction lining portions 32, 34 are manufactured from the same paper. The papers used for the respective friction lining portion thus at least have the same composition, preferably also the same density and/or the same thickness. However, due to the compression or indeed greater compression of the paper for the second friction lining portion 34, the density of the second friction lining portion 34 or of the paper on which the latter is based is increased relative to the density of the first friction lining portion 32. The resilience of the second friction lining portion 34 is thus also purposefully reduced in the axial direction 4, 6. In relation thereto, due to the fact that the first friction lining portion 32 was not compressed or was compressed to a lesser extent in the axial direction 4, 6, said first friction lining portion exhibits greater resilience in the axial direction 4, 6.

In order, on the one hand, to be able to make the differences between the first and second friction lining portions 32 and 34 with regard to the resilience thereof in the axial direction 4, 6 still more marked and, on the other hand, to set them very accurately or purposefully, the first friction lining portions 32 have a lower resin absorption than the second friction lining portions 34. The difference in resin absorption accordingly amounts to at least 15 percentage points or at least 20 percentage points, preferably at least 24 percentage points, such that the first friction lining portions 32 exhibit substantially greater resilience in the axial direction 4, 6 than the second friction lining portions 34. In order to provide a paper friction lining 24 on the friction plate 2 which has a long service life, exhibits good friction behavior and permits reliable separation of the mutually adjacent plates within a multiplate clutch or brake in the disengaged state, the resin absorption of the first friction lining portions 32 and the second friction lining portions 34 in each case amounts to between 20% and 60%, preferably between 24% and 56%. It has furthermore proved advantageous with regard to manufacture for the same resin, preferably exclusively the same resin, to be absorbed in each of the first friction lining portions 32 and the second friction lining portions 34.

As is apparent from FIG. 2, the first friction sub-surface 36 of each first friction lining portion 32 is segmented. In the embodiment shown, this is achieved in that the first friction lining portion 32 is itself segmented and thus formed of three mutually separate segments 42, 44, 46. Each of the stated segments 42, 44, 46 here defines with at least one of the other segments 42, 44, 46 a cooling oil groove 48, 50. Since in this embodiment the first friction lining portion 32 is itself segmented, the bottom of the cooling oil grooves 48, 50 is formed by the front side 22 of the friction lining carrier 18. Alternatively, however, just the friction surface formed by the first friction lining portion 32, thus the first friction sub-surface 36, could be segmented, while the first friction lining portion 32 itself is in one piece. This could, for example, be achieved in that the cooling oil grooves 48, 50 are provided only on the surface in the first friction lining portion 32 and thus do not extend downward as far as the front side 22 of the friction lining carrier 18 in the axial direction 6.

It is additionally apparent from FIG. 2 that the first friction lining portion 32 extends from the inner edge 26 of the paper friction lining 24 in the radial direction 8 to the outer edge 28 of the paper friction lining 24. It may thus also be stated that the first friction lining portion 32 in each case forms both part of the inner edge 26 and part of the outer edge 28 of the paper friction lining 24. Furthermore, the first friction lining portion 32 has a greater extent in the circumferential direction 12, 14 in an outer region in the radial direction 8 than in an inner region in the radial direction 10. The two adjacent second friction lining portions 34, on the other hand, have a smaller extent in the circumferential direction 12, 14 in an outer region in the radial direction 8 than in an inner region in the radial direction 10 of the second friction lining portion 34. It may also be stated that the first friction lining portion 32 is T-shaped, which gives rise to advantageous friction behavior. The first friction lining portion 32 is thus arranged in alignment at least in part in the radial direction 8, 10 with a second friction lining portion 34 which is adjacent in the circumferential direction 12, 14. The corresponding angular portions a, in which the first friction lining portion 32 is arranged in alignment in the radial direction 8, 10 with the second friction lining portion 34, are indicated in FIG. 2.

It is furthermore apparent from FIG. 2 that, in this region, the segment 42 of the first friction lining portion 32 and thus also the first friction sub-surface 36 of the first friction lining portion 32 are continuous from the inner edge 26 to the outer edge 28 of the paper friction lining 24. Thanks to this fact, when the associated multiplate clutch or brake is disengaged, a separating force for separating the mutually assigned plates is provided over the entire width of the paper friction lining 24. Furthermore, a blind groove 52 is formed in this continuous segment 42, the inlet opening 54 of which blind groove is arranged at the inner edge 26 of the paper friction lining 24, the blind groove 52 extending outward in the radial direction 8 starting from the inlet opening 54 on the inner edge 26. The blind groove 52 here tapers in the radial direction 8 towards the outside, as may be inferred from FIG. 2. As a result of the dynamic pressure arising within the cooling oil in the blind groove 52, separation of the mutually assigned plates within the wet-running multiplate clutch or brake in the disengaged state may be assisted. The blind groove 52 here extends beyond the center line 56 of the paper friction lining 24 taking the form of an annular disk, in order to intensify this effect still further.

As is apparent from FIG. 1, the stated blind grooves 52 are formed only in the first friction lining portions 32, but not in the second friction lining portions 34, in order to achieve a distinct functional separation. The function of the first friction lining portions 32 is accordingly substantially to separate the plates in the disengaged state of the wet-running multiplate clutch or brake, while the function of the second friction lining portions 34 is substantially to achieve an appropriate friction moment between the mutually adjacent plates within the engaged multiplate clutch or brake, without the second friction sub-surface 38 of the second friction lining portions 34 being reduced in size by a corresponding blind groove 52.

FIG. 4 shows a second embodiment of the friction plate 2 according to the invention, which substantially corresponds to the first embodiment according to FIGS. 1 to 3, such that only the differences are addressed below, the same reference signs are used for identical or similar parts and the preceding description of the first embodiment furthermore applies correspondingly.

In contrast to the first embodiment, the blind groove 52 in the second embodiment is not formed in the first friction lining portions 32, but instead exclusively in the second friction lining portions 34. In the second embodiment according to FIG. 4, the above-mentioned functional separation between the first and second friction lining portions 32, 34 is eliminated. Furthermore, the first friction lining portion 32 in the embodiment according to FIG. 4 is formed from more than three segments, namely from segments 58, 60, 62, 64, 66, none of the segments of the first friction sub-surface 36 formed by the first friction lining portion 32 or of the first friction lining portion 32 itself being continuous from the inner edge 26 to the outer edge 28 of the paper friction lining 24. Although not shown, this is, however, also preferred in the embodiment according to FIG. 4 in order to achieve the above-mentioned advantages.

FIG. 5 shows a third embodiment of the friction plate 2 according to the invention, which substantially corresponds to the embodiment according to FIGS. 1 to 3, such that only the differences are addressed below, the same reference signs are used for identical or similar parts and the preceding description of the first embodiment furthermore applies correspondingly.

In the embodiment according to FIG. 5, the first friction lining portion 32 again comprises more than three, more specifically five, segments 42, 44, 46, 68, 70, each of the segments 42, 44, 46, 68, 70 defining with at least one other of the segments 42, 44, 46, 68, 70 a cooling oil groove (no reference sign). Furthermore, the first and second friction lining portions 32 and 34 which are mutually adjacent in the circumferential direction 12, 14 do not overlap in the radial direction 8, 10. This may generate advantages on application of the paper friction lining 24 or the various friction lining portions 32, 34 onto the friction lining carrier 18, this substantially depending on the apparatus used for applying the friction lining portions 32, 34. With regard to friction and separation behavior, however, the at least partially aligned arrangement of the first and second friction lining portions 32 and 34 in the radial direction 8, 10 described with reference to FIGS. 1 to 4 is preferred.

A feature common to all three embodiments is that the paper friction lining 24 thereof comprises a substantially circumferential first groove 72 in the circumferential direction 12, 14, which zig-zags or undulates between inflection points 74, 76 located towards the inside in the radial direction 10 and towards the outside in the radial direction 8. A plurality of second grooves 78 are here provided, which extend, starting from the inner edge 26 of the paper friction lining 24, in the radial direction towards the outer inflection points 76, and a plurality of third grooves 80, which extend, starting from the outer edge 28 of the paper friction lining 24, into the circumferential first groove 72 and, between the inflection points 74, 76, lead at junctions 82 into the circumferential first groove 72. Fourth grooves 84 are furthermore preferably provided in the paper friction lining 24 which extend, starting from the inner edge 26 of the paper friction lining 24, towards the inner inflection points 74.

As is apparent from FIGS. 1 to 5, the substantially circumferential first groove 72 is not continuously circumferential or continuous in the circumferential direction 12, 14. The first groove 72 is instead in each case interrupted in the circumferential direction 12, 14 in the region of the blind grooves 52. Particularly good and reliable separation of the mutually assigned plates within a wet-running multiplate clutch or brake is achieved in this manner.

LIST OF REFERENCE SIGNS

2 Friction plate
4 Axial direction
6 Axial direction
8 Radial direction
10 Radial direction
12 Circumferential direction
14 Circumferential direction
16 Axis of rotation
18 Friction lining carrier
20 Internal teeth
22 Front side
24 Paper friction lining
26 Inner edge
28 Outer edge
30 Total friction surface
32 First friction lining portion
34 Second friction lining portion
36 First friction sub-surface
38 Second friction sub-surface
40 Common plane
42 Segment
44 Segment
46 Segment
48 Cooling oil groove
50 Cooling oil groove
52 Blind groove
54 Inlet opening
56 Center line
58 Segment
60 Segment
62 Segment
64 Segment
68 Segment
70 Segment
72 First groove
74 Inflection point (inner)
76 Inflection point (outer)
78 Second grooves
80 Third grooves
82 Junctions
84 Fourth grooves
a Difference in height
b Lining thickness
c Lining thickness
α Angular portions

What is claimed is:

1. A friction plate (2) with a friction lining carrier (18) and a paper friction lining (24) arranged on one side of the friction lining carrier (18) to form a friction surface, wherein the paper friction lining (24) comprises at least one first friction lining portion (32) and at least one second friction lining portion (34), a first friction surface (36) in the first friction lining portion (32) being raised relative to a second friction surface (38) in the second friction lining portion (34), wherein the first friction lining portion (32) exhibits a lower resin absorption than the second friction lining portion (34).

2. The friction plate (2) as set forth in claim 1, wherein the difference in resin absorption amounts to at least 15 percentage points.

3. The friction plate (2) as set forth in claim 1, wherein the resin absorption of the first friction lining portion (32) and of the second friction lining portion (34) in each case amounts to between 20% and 60%.

4. The friction plate (2) as set forth in claim 1, wherein at least one of the same resin is absorbed in the first friction lining portion (32) and the second friction lining portion (34) or the first friction lining portion (32) and the second friction lining portion (34) are manufactured from the same paper, the second friction lining portion (34) exhibiting a smaller lining thickness (c) produced by compression thereof, on fastening to the friction lining carrier (18), than the first friction lining portion (32).

5. The friction plate (2) as set forth in claim 1, wherein the friction surface (36) in the first friction lining portion (32) is arranged at most 0.12 mm higher than the friction surface (38) in the second friction lining portion (34) or the sides of the first and second friction lining portions (32, 34) facing the friction lining carrier (18) are supported in a common plane (40) on the friction lining carrier (18).

6. The friction plate (2) as set forth in claim 1, wherein the friction surface formed by the first friction lining portion (32) amounts to less than 50% of the total friction surface (30).

7. The friction plate (2) as set forth in claim 1, wherein the paper friction lining (24) comprises at most seven of the first friction lining portions (32), which are spaced apart from one another in the circumferential direction (12, 14) with interposed arrangement of the second friction lining portions (34).

8. The friction plate (2) as set forth in claim 1, wherein the first friction surface (36) formed by an individual first friction lining portion (32) is segmented to define a cooling oil groove (48, 50).

9. The friction plate (2) as set forth in claim 1, further comprising a blind groove (52) formed in the first friction lining portion (32) or in the second friction lining portion (34), the blind groove extending in the radial direction (8) starting from an inner edge (26) of the paper friction lining (24), the blind groove (52) tapering in the radial direction (8).

10. A method for producing a friction plate (2) comprising impregnating a first paper with resin to achieve a predefined first resin absorption and impregnating a second paper with resin to achieve a predefined second resin absorption which is greater than the first resin absorption, the difference in resin absorption amounting to at least 15 or at least 20 percentage points, providing a friction lining carrier (18), applying the first paper onto the friction lining carrier (18) to produce at least one first friction lining portion (32) and applying the second paper onto the friction lining carrier (18) to produce at least one second friction lining portion (34), such that a friction surface (36) in the first friction lining portion (32) is raised relative to a friction surface (38) in the second friction lining portion (34).

11. The method as set forth in claim 10, wherein the first paper and the second paper are impregnated with the same resin.

12. The method as set forth in claim 10, wherein the second paper is compressed, with reduction of the paper thickness of the second paper on fastening to the friction lining carrier (18), in such a manner that the lining thickness (c) of the second friction lining portion (34) is less than the lining thickness (b) of the first friction lining portion (32).

13. The method as set forth in claim 10, wherein the first paper is applied onto the friction lining carrier (18) in such a manner that the first friction lining portion (32) extends from the inner edge (26) to the outer edge (28) of the paper friction lining (24), and the second paper is applied onto the friction lining carrier (18) in such a manner that the first friction lining portion (32) is arranged in alignment at least in part in the radial direction (8, 10) with a second friction lining portion (34) which is adjacent in the circumferential direction (12, 14).

14. A wet-running, hydraulically actuatable, multiplate clutch or brake having at least one friction plate (2) as set forth in claim 1, a steel plate being assigned to the friction plate (2), and wherein the steel plate and the friction plate (2) may be brought into frictional rotational drive connection.

15. The friction plate (2) as set forth in claim 3, wherein the resin absorption of the first friction lining portion (32) and of the second friction lining portion (34) in each case amounts to between 24% and 56%.

16. A friction plate (2) with a friction lining carrier (18) and a paper friction lining (24) arranged on one side of the friction lining carrier (18) to form a friction surface, wherein the paper friction lining (24) comprises at least one first friction lining portion (32) and at least one second friction lining portion (34), a first friction surface (36) in the first friction lining portion (32) being raised relative to a second friction surface (38) in the second friction lining portion (34), wherein the first friction lining portion (32) exhibits a lower resin absorption than the second friction lining portion (34); and wherein the first friction lining portion (32) extends from an inner edge (26) to an outer edge (28) of the paper friction lining (24), the first friction lining portion (32) being arranged in alignment at least in part in the radial direction (8) with the second friction lining portion (34) which is adjacent in the circumferential direction (12, 14), a segment (42) of the friction surface (36) formed by the first friction lining portion (32) or of the first friction lining portion (32) itself being formed continuously from the inner edge (26) to the outer edge (28) of the paper friction lining (24) and a blind groove (52) being formed in said continuous segment (42).

* * * * *